(12) United States Patent
Niwa et al.

(10) Patent No.: US 6,187,463 B1
(45) Date of Patent: Feb. 13, 2001

(54) MATERIAL FOR SINTERING APPLIANCE

(75) Inventors: Shigeki Niwa; Tadashi Kimura, both of Kanagawa; Hiroshi Okada; Toshiyuki Suzuki, both of Aichi, all of (JP)

(73) Assignee: Toshiba Ceramics Co., Ltd., Tokyo (JP)

( * ) Notice: Under 35 U.S.C. 154(b), the term of this patent shall be extended for 0 days.

(21) Appl. No.: 09/366,051

(22) Filed: Aug. 2, 1999

Related U.S. Application Data

(63) Continuation-in-part of application No. 09/061,335, filed on Apr. 17, 1998, now Pat. No. 5,972,529.

(30) Foreign Application Priority Data

Apr. 18, 1997 (JP) .................................................. 9-101819

(51) Int. Cl.⁷ ...................................................... B32B 17/00
(52) U.S. Cl. ........................... 428/701; 428/702; 428/446
(58) Field of Search ..................................... 428/701, 702, 428/446

(56) References Cited

U.S. PATENT DOCUMENTS 5,804,324  9/1998  Niwa .
5,972,529 * 10/1999  Niwa .

FOREIGN PATENT DOCUMENTS 3-77652  12/1991  (JP) .
4-566    1/1992   (JP) .

* cited by examiner

Primary Examiner—Timothy M. Speer
(74) Attorney, Agent, or Firm—Foley & Lardner

(57) ABSTRACT

The present invention has been achieved by a material for a sintering appliance which comprises a base material comprising alumina×silica containing from 65 to 95% by weight of $Al_2O_3$ having formed on the surface thereof a flame-coated film comprising $ZrO_2$ and CaO as main components, wherein the content of CaO is from 23 to 30% by weight based on the weight of the $ZrO_2$ and CaO, the mineral composition of the main components of the coated film is calcium zirconate. Preferably the difference of thermal expansion between the base material and the flame-coated film is 0.3% or more at 1,200° C.

6 Claims, No Drawings

MATERIAL FOR SINTERING APPLIANCE

This application is a continuation-in-part of application Ser. No. 09/061,335, filed Apr. 17, 1998 now U.S. Pat. No. 5,972,529.

BACKGROUND OF THE INVENTION

1. Field of the Invention

The present invention relates to a material for a sintering appliance which is used for sintering a functional ceramic and a ceramic powder.

2. Description of the Related Art

For maintaining the prescribed characteristics of sintered products, it is required that the components of the material for a sintering appliance which is used for sintering a functional ceramic, e.g., electrical parts, should not react with the member of the substance to be sintered, or the components of the substance to be sintered should not be absorbed in the material for a sintering appliance during sintering. For that sake, in many cases, a dense or low reactive film layer is formed on the surface of the material for a sintering appliance.

For forming such a film layer on the surface of the base material, various methods are adopted, e.g., a method comprising casting or spraying slurried film components on the surface of the molded, or molded and further sintered, base material, then sintering; a method comprising fixing a film layer on the surface of the molded, or molded and further sintered, base material by means of an adhesive material, e.g., a vitreous material; and a method comprising forming a film layer by flame-coating and at the same time baking it on the surface of the base material previously sintered.

Of these, a method by flame-coating is particularly preferred because a dense coated film can be obtained on the surface of the base material and abrasion resistance of the coated film per se is high. Therefore, when the film layer of the material is formed by flame-coating, the component of the substance to be sintered (e.g., Pb, Bi, Na, K, etc.) hardly penetrate the base material through the film layer to deteriorate the base material and generate cracks or warps.

Alumina and zirconia are used in general as the material of the film in a flame-coating method taking the cost, the reactivity with the substance to be sintered, and the use life of the coated film into consideration. In particular, when the reactivity resistance is important, zirconia is used.

Further, for preventing peeling-off attributable to difference of thermal expansion between the base material and the flame-coated zirconia film from occurring, zirconia is often used as stabilized zirconia or partially stabilized zirconia in a zirconia flame-coated film. In view of reactivity resistance and cost saving, yttrium oxide ($Y_2O_3$) and calcium oxide (CaO) are generally used as a stabilizer. However, in recent years, higher quality of sintered functional ceramic and ceramic powder has been further demanded. Therefore, in the sintering of a certain soft ferrite and dielectric ceramic and a special ceramic powder, the content of CaO in a zirconia film must be increased to ensure the characteristics of a sintered product, as a result, a part of components of the substance to be sintered happens to react with the base material.

However, if the content of CaO in a zirconia film is further increased, base materials for use are limited correspondingly while such base materials have a drawback on use life such that cracks are generated due to properties of base materials per se.

With respect to this problem, JP-B-3-77652 (the term "JP-B" as used herein means an "examined Japanese patent publication") discloses a technique comprising flame-coating stabilized zirconia containing from 4 to 31% by weight of CaO on an alumina-silica base material containing 85% by weight or more of alumina. However, JP-B-77652 discloses that if thermal expansion of the base material and the flame-coated film are not approximated, the coated film is liable to peel off, for example, if the difference of thermal expansion between both at 1,200° C. is 0.06% or more, the coated film peels off.

Further according to this technique, as the more the content of the stabilizer (CaO), the more increases the thermal expansion of the stabilized zirconia, it is necessary to use the alumina-silica base material having a large alumina content and this technique limits the content of alumina to 85% by weight or more.

Accordingly, if a flame-coated film having a large content of CaO is used, the alumina content of the base material has to be increased correspondingly. In such a case, however, the base material itself is liable to crack and the use life of the material of the appliance itself becomes low, although the characteristics of the flame-coated film can be obtained. Further, there is a problem such that the coated film of the stabilized zirconia in some cases lets CaO free with the destabilization by thermal hysteresis and the free CaO reacts with sintered products.

JP-B-4-568 discloses a technique comprising flame-coating stabilized zirconia having a CaO content of from 4 to 15% by weight on the surface of an alumina base material so as to gradually decrease the content of CaO. However, the thus-obtained material of the appliance has less content of CaO of the surface side, which cannot be effectively used for sintering dielectric ceramic and a special ceramic powder unless the content of CaO in zirconia film is increased.

Further, JP-B-4-21330 discloses a technique in which a flame-coated alumina layer or a sintered alumina layer intervenes between an alumina base material and a zirconia flame-coated layer to improve adhesion of the base material with the zirconia layer by lessening difference of thermal expansion between the base material and the zirconia film layer. However, this technique requires two or more steps of flame-coating, which is expensive. Moreover, also in this case, stabilized zirconia or partially stabilized zirconia containing 8% by weight or less of CaO is used for coating, which cannot be used for sintering a special powder, etc. as above.

SUMMARY OF THE INVENTION

An object of the present invention is to provide a material for a sintering appliance which comprises an alumina base material having formed on the surface thereof, by flame-coating, a coated film comprising $ZrO_2$ and CaO as main components and the mineral composition of the main components being calcium zirconate to thereby obtain a coated film having a high CaO content on the surface of the base material, excellent characteristics of the substance to be sintered without causing the reaction of the components of the substance to be sintered with the coated film and, further, the base material which hardly cracks.

The above object of the present invention has been achieved by a material for a sintering appliance of a first aspect of the present invention, which comprises a base material comprising alumina-silica containing from 65 to 95% by weight of $Al_2O_3$ having formed on the surface thereof a flame-coated film comprising $ZrO_2$ and CaO as main components, wherein the content of CaO is from 23 to 30% by weight based on the weight of the $ZrO_2$ and CaO, the mineral composition of the main components of the coated film is calcium zirconate., and the difference of thermal expansion between the base material.

A second aspect of the material is the material according to the first aspect, wherein the difference of thermal expansion between the base material and the flame-coated film is 0.3% or more at 1,200° C.

A third aspect of the material is the material according to the first aspect, wherein said flame-coated film contains from 1 to 5% by weight of $TiO_2$ in addition to the main components $ZrO_2$ and CaO.

A fourth aspect of the material is the material according to the first aspect, wherein said flame-coated film is formed by the flame-coating method using a particle size of the powder of 150 μm or less.

A fifth aspect of the material is the material according to the first aspect, wherein said flame-coated film is formed by the flame-coating method using a particle size of the powder from 30 to 130 μm.

A sixth aspect of the material is the material according to the first aspect, wherein thickness of the flame-coated film is from 0.1 to 2 mm.

A seventh aspect of the material is the material according to the first aspect, wherein the base material is made of alumina-silica containing from 70 to 90% by weight of $Al_2O_3$; and the flame-coated film contains CaO from 25 to 29% by weight based on the weight of the $ZrO_2$ and CaO.

DETAILED DESCRIPTION OF THE PREFERRED EMBODIMENT

A material for a sintering appliance according to the present invention comprises an alumina-silica base material having formed on the surface thereof a flame-coated film comprising calcium zirconate ($CaZrO_3$). The base material contains from 65 to 95% by weight of $Al_2O_3$. Other component of the base material is silica. If $Al_2O_3$ content of the base material is less than 65% by weight, the bending resistance property of the base material per se is deteriorated, while when it exceeds 95% by weight, spalling resistance property of the base material per se is disadvantageously deteriorated.

The flame-coated film formed on the surface of the base material comprises $ZrO_2$ and CaO as main components. The content of CaO is from 23 to 30% by weight based on the weight of the $ZrO_2$ and CaO, and the mineral composition of the main components of the coated film is calcium zirconate ($CaZrO_3$). Stabilized zirconia which is a mixture of zirconia and CaO or partially stabilized zirconia has conventionally been used as a material for a flame-coated film. By using calcium zirconate in the present invention, CaO is not let be free to react with the substance to be sintered during use in high temperature even the CaO content in the coated film is high. Therefore, excellent characteristics of the sintered product can be obtained.

Well-known flame-coating methods can be used in the present invention. The particle size of the powder for use in flame-coating is 150 μm or less, preferably from 30 to 130 μm. The thickness of the coated film is from 0.1 to 2 mm. If the thickness of the coated film is less than 0.1 mm, a uniform film cannot be formed and if it exceeds 2 mm manufacturing cost becomes high.

The thermal expansion of the flame-coated calcium zirconate film of the appliance material according to the present invention at 1,200° C. is around 1.3%, which shows extremely excellent adhesion property with the alumina-silica base material notwithstanding the difference of thermal expansion between both at 1,200° C. being 0.3% or more. Therefore, according to the present invention, even if a high silica material is used as a base material, a crack attributable to thermal hysteresis is not liable to occur and firm adhesion of the coated film with the base material can be ensured.

The difference of thermal expansion between the base material and the flame-coated film is broadened by increasing the CaO content in the coated film to heighten the thermal expansion thereof, on the other hand, increasing the silica content in the base material to reduce the thermal expansion thereof. In the present invention, even if the difference of thermal expansion between the base material and the flame-coated film is made 0.3% or more by increasing the CaO content in the coated film and increasing the silica content in the base material, characteristics of the sintered product can be obtained, the base material hardly generates cracks, and the firm adhesion of the flame-coated film with the base material can be realized.

The reason why the flame-coated calcium zirconate film firmly adheres to the alumina-silica base material is not necessarily clear but it is presumably because calcium zirconate and the silica component in the base material react each other at flame-coating to form a firm reactive layer. Accordingly, it is preferred that a large amount of CaO is contained in the flame-coated layer and more than a certain amount of silica component is contained in the base material.

Further, when the flame-coated film contains from 1 to 5% by weight of $TiO_2$, the strength of the flame-coated film is further advantageously improved.

Another material for a sintering appliance according to the present invention can further comprise a second (intermediate) flame-coated film made of alumina-silica containing from 65 to 99% by weight of $Al_2O_3$. Further the second flame-coated film can be replaced if desired for any reason by a mullite flame-coated film. According to such a structure, the bending resistance property of the base material per se is generally not deteriorated, and other resistance properties of the base material per se are also generally not disadvantageously deteriorated.

Further since an alumina-silica flame-coated film or a mullite flame-coated film has the effect that use of the same as described can often prevent the base material component from penetrating as the $CaO—ZrO_2$ flame-coated film, the amount of expensive $ZrO_2$ necessary for many applications can be reduced by the thickness of the alumina-silica flame-coated film or mullite flame-coated film.

The thickness of the second flame-coated film is preferably not more than 2 mm. If the thickness of the second flame-coated film exceeds 2 mm manufacturing cost and weight become high and the film may tend to peel off. In addition, the thickness of the second flame-coated film is preferably not less than 0.1 mm in order to prevent penetration into the film layer.

Further by using $CaO—ZrO_2$ as a flame-coated film, an extremely excellent adhesion property can be shown, in comparison with a conventional stabilized $ZrO_2$ flame-coated film. The reason for the better adhesion is not only the difference of thermal expansion but also thermal stability and chemical stability. $CaO—ZrO_2$ is extremely thermally stable within a temperature range between room temperature (about 20° and 2000° C.). And since $CaO—ZrO_2$ is chemically stable, it is difficult to react with the component to form a new compound, that is, it does not readily react with other components. According to the above advantage, the adhesion property between the second flame-coated film and the $CaO-ZrO_2$ flame-coated film is extremely excellent.

EXAMPLE

Calcium zirconate ($CaZrO_3$) having a particle size of from 30 to 130 μm was prepared as a material for flame-coating, which was plasma-coated on the base material each having the $Al_2O_3$ content of from 65 to 95% by weight and $SiO_2$ accounting for the remaining part as shown in Table 1. The size of the base material was 215×215×8 (mm) and the thickness of the coated film was 0.3 mm. The composition of the material for flame-coating was substantially the same with the composition of the coated film after flame-coating.

Each of the thus-obtained materials for a sintering appliance was tested in an electric furnace by increasing and lowering the temperature between 1,400° C. and 300° C. for peeling-off and wearing of the flame-coated film of the sintering appliance material and cracks and warps of the base material.

Further, sintering was repeated at 1,350° C. using a special dielectric ceramic the characteristics of the sintered product of which could not be practically obtained if the content of CaO in the zirconia coated film was not more than 20%, and the reactivity resistance of the sintered product and the use life of the appliance material were examined. The results obtained are shown in Table 1.

Further, the same experiments as in the above example were conducted except for using the base material having an $Al_2O_3$ content out of the range of the present invention (Comparative Examples 1 and 2), using the flame-coating material having a CaO content out of the range of the present invention (Comparative Examples 3 and 4), and using stabilized zirconia in the flame-coated layer (Comparative Examples 5 and 6). The results obtained are shown in Table 2.

TABLE 1

| | Example No. | | | | | | | |
|---|---|---|---|---|---|---|---|---|
| | 1 | 2 | 3 | 4 | 5 | 6 | 7 | 8 |
| CaO content in the flame-coated layer (wt %) | 23 | 30 | 23 | 30 | 23 | 30 | 23 | 30 |
| Main mineral in the flame-coated layer | | | | Calcium zirconate | | | | |
| $Al_2O_3$ content in the base material (wt %) | 65 | 65 | 70 | 70 | 93 | 93 | 95 | 95 |
| Thermal expansion of the base material (%) | 0.52 | 0.52 | 0.60 | 0.60 | 0.88 | 0.88 | 0.90 | 0.90 |
| Thermal expansion of the flame-coated layer (%) | 1.20 | 1.32 | 1.20 | 1.32 | 1.20 | 1.32 | 1.20 | 1.32 |
| Difference of thermal expansion between the base material and the flame-coated layer *2(%) | 0.68 | 0.80 | 0.60 | 0.72 | 0.32 | 0.44 | 0.30 | 0.42 |
| Results of cyclic heating test in an electric furnace | Bent in $42^{nd}$ time | Bent in $43^{rd}$ time | Bent in $60^{th}$ time | Bent in $62^{nd}$ time | Cracked in $43^{rd}$ time | Cracked in $38^{th}$ time | Cracked in $41^{st}$ time | Cracked in $36^{th}$ time |
| Results of sintering of special dielectric ceramic in a real sintering appliance | Bent in $31^{st}$ time | Bent in $33^{rd}$ time | Characteristics were NG in $40^{th}$ time | Characteristics were NG in $52^{nd}$ time | Cracked in $35^{nd}$ time | Cracked in $33^{rd}$ time | Cracked in $33^{rd}$ time | Cracked in $32^{nd}$ time |

*1: Particle size of the material for flame-coating: from 30 to 130 μm
*2: Thermal expansion at 1,200° C.

TABLE 2

| | Comparative Example No. | | | | | | | |
|---|---|---|---|---|---|---|---|---|
| | 1 | 2 | 3 | 4 | 5 | 6 | 7 | 8 |
| CaO content in the flame-coated layer (wt %) | 23 | 23 | 20 | 35 | 23 | 30 | 23 | 30 |
| Main mineral in the flame-coated layer | | | Calcium zirconate | | | Stabilized zirconia | | |
| $Al_2O_3$ content in the base material (wt %) | 60 | 98 | 70 | 70 | 70 | 70 | 93 | 93 |
| Thermal expansion coefficient of the base material (%) | 0.55 | 0.93 | 0.60 | 0.60 | 0.60 | 0.60 | 0.88 | 0.88 |
| Thermal expansion coefficient of the flame-coated layer (%) | 1.20 | 1.20 | 1.15 | 1.37 | 1.15 | 1.26 | 1.15 | 1.26 |
| Difference of thermal expansion coefficients between the base material and the flame-coated layer *2(%) | 0.65 | 0.27 | 0.55 | 0.77 | 0.55 | 0.66 | 0.27 | 0.38 |
| Results of cyclic heating test in an electric furnace | Bent in $15^{th}$ time | Bent in $5^{th}$ time | Bent in $63^{rd}$ time | Bent in $58^{th}$ time | Peeled off in $3^{rd}$ time | Peeled off in $2^{nd}$ time | Peeled off in $8^{th}$ time | Peeled off in $6^{th}$ time |
| Results of sintering of special dielectric ceramic in a real sintering appliance | Bent in $8^{th}$ time | Cracked in $1^{st}$ time | Characteristics were NG in $22^{nd}$ time | *3 | Characteristics were lost in $5^{th}$ time to $10^{th}$ time, or peeled off in several times | | | |

*2: Thermal expansion coefficient at 1,200° C.
*3: The CaO content was larger than that of calcium zirconate composition, free CaO was liable to react with the water content in the atmosphere and digested, therefore, manufacturing as a commercial product is difficult.

As is apparent from Examples 1 to 8, as a result of cyclic heating test in an electric furnace, crack and bending occurred in 36 times at the minimum and in 62 times at the maximum. With respect to sintering of special dielectric ceramic in a real sintering appliance, the time until a crack occurred or the characteristics of the sintered product did not come out was 31 times at the minimum and 52 times at the maximum. "Characteristics were NG" in the tables means that "the characteristics of the sintered product did not come out".

On the contrary, samples in Comparative Examples 1 and 2 generated a crack or bending in 5 times and 15 times, respectively. In the sintering of dielectric ceramic in a real sintering appliance, the time until the characteristics of the sintered product did not come out of the sample in Comparative Example 3 was only 22 times. The sample in Comparative Example 4 cannot be used for the sintering of special dielectric ceramic. Flame-coated layers of samples in Comparative Examples 5 to 8 comprise stabilized zirconia. These samples generated cracks and bending in 2 to 8 times in the cyclic heating test in an electric furnace, and in the sintering of dielectric ceramic in a real sintering appliance, the time until a crack occurred or the characteristics of the sintered product did not come out was from 5 to 10 times.

TABLE 3

| | Example No. | |
|---|---|---|
| | 9 | 10 |
| Cao content in the flame-coated layer (wt %) | 28 | 28 |
| Main mineral in the flame coated layer | Calcium Zirconate | |
| Second Flame-coated layer interposed between the base material and the foam-coated layer | Aluminum | mullite |
| $Al_2O_3$ content in the base material (wt %) | 93 | 70 |
| Thermal expansion of the base material (%) | o.88 | 0.52 |
| Thermal expansion of the second flame-coated layer (%) | 0.90 | 0.64 |
| Thermal expansion of the flame-coated layer (%) | 1.30 | 1.30 |
| Difference of thermal expansion between second flame-coated layer (the base material) and the flame-coated layer *2(%) | 0.40 | 0.66 |
| Results of cyclic heating test in an electric furnace | Cracked In 45$^{th}$ time | Bent in 80$^{th}$ time |
| Results of sintering of special dielectric ceramic in a real sintering appliance | Cracked In 40$^{th}$ time | Characteristics were NG In 65$^{th}$ time |

*1: Particle size of the material for flame-coating: from 30 to 130 μm
*2: Thermal expansion at 1,200° C.
Thickness of the second flame-coated layer: 0.2 mm
Thickness of the flame-coated layer: 0.1 mm

TABLE 4

| | Comparison Example No. | |
|---|---|---|
| | 9 | 10 |
| Cao content in the flame-coated layer (wt %) | 6 | 6 |
| Main mineral in the flame coated layer | Stabilized Zirconia | |
| Second Flame-coated layer interposed between the base material and the foam-coated layer | aluminum | mullite |
| $Al_2O_3$ content in the base material (wt %) | 93 | 70 |
| Thermal expansion of the base material (%) | o.88 | 0.60 |
| Thermal expansion of the second flame-coated layer (%) | 0.90 | 0.64 |
| Thermal expansion of the flame-coated layer (%) | 1.10 | 1.10 |
| Difference of thermal expansion between second flame-coated layer (the base material) and the flame-coated layer *2(%) | 0.20 | 0.46 |
| Results of cyclic heating test in an electric furnace | Cracked In 40$^{th}$ time | Peeled off In 50$^{th}$ time |
| Results of sintering of special dielectric ceramic in a real sintering appliance | Characteristic were NG In 7$^{th}$ time | Characteristics were NG In 65$^{th}$ time |

*1: Particle size of the material for flame-coating: from 30 to 130 μm
*2: Thermal expansion at 1,200° C.
Thickness of the second flame-coated layer: 0.2 mm
Thickness of the flame-coated layer: 0.1 mm As described above, due to the flame-coated film according to the present invention comprising calcium zirconate ($CaZrO_3$) which is a compound comprising zirconia and CaO, even with the high CaO content flame-coated film, free CaO can be prevented from reacting with the substance to be sintered by repeated use, thereby characteristics of the sintered product can be obtained. Owing to such constitution of the present invention, the desired characteristics of special functional ceramic and a ceramic powder can be obtained, which cannot be obtained using conventional sintering appliances flame-coated with zirconia. Moreover, as this flame-coating material shows excellent adhesive property with the base material having a high silica content and a low thermal expansion, the base material which The priority document JP 9-101819 filed Apr. 18, 1997 is incorporated herein by reference in its entirety.

We claim:

1. A material for a sintering appliance which comprises:
   a base material comprising alumina-silica containing from 65 to 95% by weight of $Al_2O_3$;
   a flame-coated film formed on the surface of the base material, comprising $ZrO_2$ and CaO as main components, wherein the content of CaO is from 23 to 30% by weight based on the weight of the $ZrO_2$ and CaO, the mineral composition of the main components of the coated film is calcium zirconate, and wherein the difference of thermal expansion between the base material and the flame-coated film is 0.3% or more at 1,200° C.; and
   a second flame-coated film made of alumina-silica containing from 65 to 99% by weight of $Al_2O_3$, which is interposed between the base material and the flame-coated film.

2. The material for a sintering appliance as claimed in claim 1, wherein said flame-coated film contains from 1 to 5% by weight of $TiO_2$ in addition to the main components $ZrO_2$ and CaO.

3. The material for a sintering appliance as claimed in claim 1, wherein said flame-coated film is formed by the flame-coating method using a particle size of the powder of 150 μm or less.

4. The material for a sintering appliance as claimed in claim 1, wherein said flame-coated film is formed by the flame-coating method using a particle size of the powder from 30 to 130 μm.

5. The material for a sintering appliance as claimed in claim 1, wherein thickness of the flame-coated film is from 0.1 to 2 mm.

6. The material for a sintering appliance as claimed in claim 1, wherein the base material is made of alumina silica containing from 70 to 90% by weight of $Al_2O_3$; and
   the flame-coated film contains CaO from 25 to 29% by weight based on the weight of the $ZrO_2$ and CaO.

* * * * *